United States Patent Office 3,228,814
Patented Jan. 11, 1966

3,228,814
HYDRAZINE SOLUTIONS OF HYDRAZINIUM POLYHYDRODODECABORATES AND THEIR PREPARATION
William A. Jenkins, Wilmington, Del., Walter H. Knoth, Jr., Mendenhall, Pa., and Henry S. Rothrock and Robert A. Smiley, Wilmington, Del., assignors to E. I. du Pont de Nemours and Company, Wilmington, Del., a corporation of Delaware
No Drawing. Filed May 7, 1962, Ser. No. 193,655
11 Claims. (Cl. 149—22)

This invention relates to compositions containing boron and nitrogen. More particularly, it relates to compositions containing hydrazines and selected boron compounds, and their preparation.

Compositions containing hydrazine and low molecular weight boron compounds are useful as liquid monopropellants for rocket propulsion motors. However, the compositions now available are deficient in one or more characteristics and they do not perform as well as desired. A need exists, for example, for compositions which combine superior stability during handling and storage with the property of releasing large quantities of energy at controllable rates.

It is an object of the present invention to provide boron-containing compositions which have excellent stability, particularly against premature thermal or oxidative decomposition and which are useful as liquid base fuels.

The compositions of the present invention are mixtures comprising a hydrazine and a hydrazinium polyhydrododecarborate(2−).

The term hydrazine, as used herein, refers to a compound of the general formula $RR'NNH_2$, wherein R and R' are hydrogen or lower alkyl groups, e.g., methyl, ethyl, propyl, butyl, and the like.

The term hydrazinium polyhydrododecarboate(2−) refers to a hydrazine salt of a divalent anion of 12 conjointly bonded boron atoms each of which is singly bonded to a monovalent element or group of elements which form a monovalent substituent.

In its simplest form, the polyhydrododecarborate anion is represented as $B_{12}H_{12}^{-2}$. However, one or more of the hydrogens on the dodecarborate cage can be replaced with substituents which are monovalent elements or monovalent groups, e.g., —OH, $NH_2$, and the like. Preferably, substituents on the dodecarborate cage, if present, are groups which may improve the solubility of the hydrazinium salts in a hydrazine. The dodecaborates, whether substituted or unsubstituted, are divalent anions which combine with 2 moles of a hydrazine to form a dihydrazinium salt.

The preferred compositions of the invention are fluid mixtures or solutions consisting principally of a hydrazine of the formula $RR'NNH_2$ and a hydrazinium dodecahydrododecarborate(2−) of the formula $$(RR'NNH_3)_2B_{12}H_{12}$$

where R and R' are hydrogen or lower alkyl groups.

Especially preferred compositions, for reasons of cost and availability of components, are solutions whose principal components are hydrazine ($NH_2NH_2$) and dihydrazinium dodecahydrododecarborate(2−), $$[(NH_2NH_3)_2B_{12}H_{12}]$$

in which the dihydrazinium salt forms up to about 60% by weight of the solution and is preferably not less than 5% by weight.

The hydrazine and the dihydrazinium polyhydrododecarboate(2−), as defined earlier, are the essential and characterizing components of the invention. Jointly these two components constitute the principal portion of the compositions, i.e., at least 80% by weight of the total composition. Minor amounts of other components can be present, in particular, components which function as freezing-point depressants, e.g., water, hydrogen sulfide, hydrogen cyanide, and the like. However, these components do not constitute the novel and characterizing feature of the compositions of the invention.

The compositions are clear solutions which are liquids at normal atmospheric temperatures. They are stable when heated in air for prolonged periods, e.g., the solutions can be heated at 95–100° C. for several hours (two or more hours) in containers exposed to the air with no evidence of decomposition. The solutions can be stored without degradation in conventional containers customarily used for hydrazines.

Solutions which contain about 35% or more by weight of the hydrazine salt in substantially pure hydrazine may form deposits on cooling but these deposits may be redissolved by adding small quantities of water or other solvents, or by heating the solution.

The compositions of the invention provide hydrazine solutions which have a high boron content and, therefore, a high boron/nitrogen ratio. To illustrate, a solution of about 25% by weight of $(NH_2NH_3)_2B_{12}H_{12}$ in hydrazine contains 15–16% of boron. In contrast, a solution of about 25% by weight of a hydrazinium salt of a lower hydroborate, e.g., $NH_2NH_3BH_4$, contains only about 6% by weight of boron. A further advantage of the compositions of the invention lies in the high rate of combustion of hydrazinium salts of polyhydrododecarborate anions, especially the $B_{12}H_{12}^{-2}$ anion. This property permits the release of large quantities of energy under readily controlled conditions. Compositions derived from salts of unsubstituted hydrazines, i.e., solutions of $$(NH_2NH_3)_2B_{12}H_{12}$$

in $NH_2NH_2$, have the added advantage of being free of carbon and their value as high energy fuels is, therefore, enhanced.

Examples of compositions which are within the scope of the invention are as follows, in which the various components are given as percent by weight of the total solution:

5% $(NH_2NH_3)_2B_{12}H_{12}$–95% $NH_2NH_2$,
10% $(NH_2NH_3)_2B_{12}H_{12}$–90% $NH_2NH_2$,
25% $(NH_2NH_3)_2B_{12}H_{12}$–75% $NH_2NH_2$,
12% $[(CH_3)_2NNH_3]_2B_{12}H_{12}$–88% $(CH_3)_2NNH_2$,
20% $[(CH_3)_2NNH_3]_2B_{12}H_{12}$–80% $NH_2NH_2$,
15% $(C_2H_5NHNH_3)_2B_{12}H_{12}$–85% $C_2H_5NHNH_2$,
17% $(NH_2NH_3)_2B_{12}H_{11}OH$–83% $NH_3NH_2$,
20% $(NH_2NH_3)_2B_{12}H_{10}(OH)_2$–80% $NH_2NH_2$,
25% $(NH_2NH_3)_2B_{12}H_{10}(NH_2)_2$–75% $NH_2NH_2$,
20% $(NH_2NH_3)_2B_{12}H_{12}$–75% $NH_2NH_2$–5% $H_2O$,
25% $(NH_2NH_3)_2B_{12}H_{12}$–65% $NH_2NH_2$–10% HCN,
20% $(NH_2NH_3)_2B_{12}H_{12}$–75% $NH_2NH_2$–5% $H_2S$,
30% $(NH_2NH_3)_2B_{12}H_{12}$–68% $NH_2NH_2$–2% $H_2O$, and
50% $(NH_2NH_3)_2B_{12}H_{12}$–45% $NH_2NH_2$–5% HCN.

Compositions of the invention containing a hydrazinium dodecahydrododecaborate are prepared simply and directly by dissolving a hydrazinium polyhydrododecaborate in a hydrazine, employing the calculated amounts of each component necessary to obtain a solution of the desired concentration.

A second and optional method consists in dissolving an acid (normally as a hydrate) of a polyhydrododecaborate of the formula $H_2B_{12}H_{12-n}X_n$ (where X is a monovalent substituent, e.g., —OH, —$NH_2$, and the like; and $n$ is a cardinal number of 0–4, inclusive) in a hydrazine. The hydrazinium salt is thus formed directly in solution. Solution of the components in either process is accomplished by simple stirring of a mixture of the components, employing heating, if desired, to expedite the process. Temperatures up to 100° C. or higher can be used.

A third method consists in dissolving an ammonium or substituted ammonium salt of the formula $$(R_3NH)_2B_{12}H_{12}$$

where R is hydrogen or lower alkyl, in a hydrazine and warming the mixture until ammonia or the trialkylamine is volatilized from the mixture. To illustrate, $$(NH_4)_2B_{12}H_{12}$$

or $[(C_2H_5)_3NH]_2B_{12}H_{12}$ is mixed with $NH_2NH_2$ and the mixture is warmed until all the $NH_3$ or $(C_2H_5)_3N$ is expelled. A temperature of at most 100° C. is generally sufficient to expel all the amines or ammonia. An ammonium or substituted ammonium polyhydrododecaborate bearing substituents bonded to boron can also be used as a reactant in this method.

Hydrazines which are employed as one reactant in the process are well known compounds of the formula $RR'NNH_2$, as described earlier. Operable hydrazines include $NH_2NH_2$, $CH_3NHNH_2$, $C_2H_5NHNH_2$, $$(CH_3)_2NNH_2, (C_2H_5)_2NNH_2, C_4H_9NHNH_2$$

and the like. The hydrazines need not be anhydrous and usually they can be employed as purchased in 90% or higher purity. The hydrazine employed to prepare the salt is not necessarily the same hydrazine employed in preparing the final solution. To illustrate $$[(CH_3)_2NNH_3]_2B_{12}H_{12}$$

can be dissolved in $NH_2NH_2$ to obtain a composition of the invention.

Acids of polyhydrododecaborates and their hydrazinium salts are not generally available products. They are obtained by reacting a trialkylamine-borane adduct of the general formula $R_3''N$—$BH_3$, where the $R''$ groups are lower alkyl, e.g., methyl, ethyl, propyl, and the like, with a boron hydride, e.g., $B_{10}H_{14}$, and isolating the trialkylammonium salt. This salt can be used directly, as described previously, or it can be converted to the free acid. The free acid is obtained by contacting a solution (aqueous or alcohol) of the trialkylammonium salt with a commercial acid ion-exchange resin and evaporating the solution so obtained to a point where the crystalline acid is obtained, generally as a hydrate. The acid can be dissolved directly, as described earlier, in a hydrazine or it can be neutralized with ammonia or ammonium hydroxide to obtain an ammonium polyhydrododecaborate. The preparation of a representative dodecahydrododecaborate salt and acid is described fully in Example A.

The compositions of the invention include solutions of hydrazinium polyhydrododecaborates which bear substituents bonded to the boron-containing group, e.g., —OH or —$NH_2$. Substituted polyhydrododecaborates are obtained by treating a salt of the $B_{12}H_{12}^{-2}$ anion or the acid, $H_2B_{12}H_{12}$, with an appropriate reagent which results in replacement of hydrogen bonded to boron by an X group. To illustrate, polyhydrododecaborates bearing from 1–4

—OH groups bonded to boron atoms are obtained as follows:

(1) A mixture of 3.0 g. of hydrated $H_2B_{12}H_{12}$ (N.E., 154) and 1.75 g. of oxalic acid is heated in a boiling water bath for 5 minutes with stirring. An exothermic reaction sets in and the temperature rises to 120° C. with vigorous bubbling. The mixture is cooled to about 25° C. and 5 ml. of water is added. The solution is neutralized with aqueous CsOH solution to phenolphthalein end point. A precipitate forms and the reaction mixture is heated to boiling with addition of the minimum amount of water needed to dissolve the precipitate at the boiling point. The solution is cooled in an ice-water bath and the crystals which form are separated to obtain $Cs_2B_{12}H_{11}OH$. The cesium salt can be dissolved in water and the aqueous solution can be passed through a column filled with an acidic ion-exchange resin of the crosslinked polystyrenesulfonic acid type. The aqueous effluent can be neutralized with a hydrazine, e.g., $NH_2NH_2$, and evaporated to dryness to obtain a hydrazinium salt, e.g.

$$(NH_2NH_3)_2B_{10}H_9OH$$

which can then be dissolved in a hydrazine in the proper amount to form a composition with the desired proportions of salt and hydrazine components.

(2) A reaction vessel is charged with a solution consisting of 20 g. of $Na_2B_{12}H_{12} \cdot 2H_2O$ and about 200 ml. of N-methyl-2-pyrrolidone. The solution is stirred and 25 ml. of hydrochloric acid is added. The mixture is filtered and the filtrate is distilled until a pot temperature of 205° C. is reached. The mixture is held at this temperature for 4 hours and it is then poured into 600 ml. of ethyl alcohol. The precipitate which forms is separated by filtration. It is purified by dissolving in acetonitrile and reprecipitating with ethanol. The product is mixed with 50 ml. of 6% aqueous NaOH solution, the mixture is refluxed for 4 hours and then cooled. A portion of this mixture is evaporated to a small volume and a concentrated aqueous solution of CsOH is added. The precipitate which forms is separated, recrystallized from water and dried to obtain $Cs_2B_{12}H_{10}(OH)_2$. This salt can be processed as described in the preceding paragraph, designated (1), to obtain a hydrazinium salt, e.g., $(NH_2NH_3)_2B_{12}H_{10}(OH)_2$, from which hydrazine solutions of the desired compositions can be obtained by conventional processes.

(3) An aqueous solution of $H_2B_{12}H_{12}$ is neutralized with a measured quantity of $Be(OH)_2$ to provide a neutral solution of $BeB_{12}H_{12}$. The solution is evaporated to dryness and the residue is dried intensively over $P_2O_5$ to obtain $BeB_{12}H_{12} \cdot 4H_2O$. A portion of this salt is heated under very low pressure over $P_2O_5$ for 52 hours at 148° C. The dried product is suspended in 100 ml. of water, 90 ml. of 1N $NH_4OH$ is added with stirring, and the mixture is filtered to remove $Be(OH)_2$. The filtrate is evaporated to dryness to yield $(NH_4)_2B_{12}H_9(OH)_3$. This salt can be processed as described in a previous paragraph, designated (1) to obtain a hydrazinium salt, e.g., $(NH_2NH_3)_2B_{12}H_9(OH)_3$, from which hydrazine solutions of the desired compositions can be obtained.

(4) A reaction vessel is charged with 70 ml. of tert.-butanol and 6 g. of hydrated $H_2B_{12}H_{12}$, i.e., $$(H_3O)_2B_{12}H_{12} \cdot 6H_2O$$

The mixture is refluxed for 2 hours and water is added. The solution is boiled to remove the butanol as an azeotrope with water. An aqueous solution remains which contains the acid $H_2B_{12}H_9(OH)_4$. The solution can be processed as described in the previous paragraph, designated (1) to obtain a hydrazinium salt, e.g., $$(NH_2NH_3)_2B_{12}H_8(OH)_4$$

Compositions of the hydrazinium salt in a hydrazine can be prepared as described earlier which have the salt and hydrazine in desired ratios.

Compositions which are illustrative of hydroxy-substituted dodecaborates are:

25% $(NH_2NH_3)_2 \cdot B_{12}H_{11}OH$–75% $NH_2NH_2$,
20% $(NH_2NH_3)_2B_{12}H_{10}(OH)_2$–80% $NH_2NH_2$,
22% $(NH_2NH_3)_2B_{12}H_9(OH)_3$–78% $NH_2NH_2$, and
15% $(NH_2NH_3)_2B_{12}H_8(OH)_4$–85% $NH_2NH_2$.

Polyhydrododecaborates bearing —$NH_2$ groups as substituents bonded to boron can be obtained by mixing the acid $H_2B_{12}H_{12}$, also referred to as $(H_3O)_2B_{12}H_{12}$, and formamide in aqueous solution. The solution is heated until water is removed completely and it is then refluxed. The solution is diluted with alcohol, e.g., $CH_3OH$, and it is then neutralized with an aqueous solution of a hydrazine. The neutralized solution can be evaporated to yield a solid hydrazinium polyhydrododecaborate bearing —NH₂ groups bonded to boron. The solid salt can be dissolved in a hydrazine to form a solution of the desired composition, e.g., 20% (NH₂NH₃)₂B₁₂H₁₁NH₂ and 80% NH₂NH₂.

The compositions of the invention and their preparation are illustrated further in the examples which follow.

*Example A*

(A) A glass vessel is employed which is fitted with a stirrer, a thermometer and a reflux condenser which is also connected to a wet test meter. The vessel is charged with 200 ml. of triethylamine-borane adduct

[(C₂H₅)₃N—BH₃]₃ 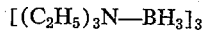

prepared as described in U.S. 2,860,167. Nitrogen gas is passed into the vessel and the reaction mass is heated to 170–175° C. A solution of 29 g. of B₁₀H₁₄ in 100 ml. of (C₂H₅)₃N–BH₃ is added to the reaction mass over a period of about one hour with vigorous stirring. After addition is complete, the reaction mixture is stirred 15 minutes maintaining the temperature at 170–175° C. Hydrogen gas is evolved at a rate which decreases sharply during the final stirring.

The reaction mass is cooled to about 25° C. to form a mixture of white solid and pale yellow liquid. The solid is separated by filtration, washed with ether and dried. There is obtained 69 g. of [(C₂H₅)₃NH]₂B₁₂H₁₂.

(B) A portion of this product is dissolved in water and the aqueous solution is passed through a column filled with a commercial acid ion-exchange resin of a crosslinked polystyrenesulfonic acid type. The aqueous effluent is a solution of H₂B₁₂H₁₂ from which the free acid is obtained in solid form as a hydrate by evaporation of the solution. The crystalline acid may contain up to 10 or more molecules of water hydration. Its exact composition is easily determined by conventional analytical procedures, e.g., titration of samples of known weight. The solution can be neutralized with a base, e.g., NaOH or NH₄OH to obtain Na₂B₁₂H₁₂ or (NH₄)₂B₁₂H₁₂. The salts are isolated by evaporation of the solution to dryness.

*Example I*

A mixture is prepared consisting of one part of (NH₄)₂B₁₂H₁₂ and about 2.5 parts of 1,1-dimethylhydrazine. The mixture is heated at steam bath temperatures for 30 minutes. Ammonia is released as a gas and a solution containing about 45% by weight of [(CH₃)₂NNH₃]₂B₁₂H₁₂ in (CH₃)₂NNH₂ is obtained.

The bis(1,1 - dimethylhydrazinium) dodecahydrododecaborate(2⁻) is isolated, if desired, by evaporation of the solution at atmospheric pressure. The compound, which is a white crystalline solid, is recrystallized from water. It is obtained with one mole of (CH₃)₂NNH₂ as solvent of crystallization.

*Analysis.*—Calculated for

[(CH₃)₂N₂H₃]₂B₁₂H₁₂·(CH₃)₂NNH₂ 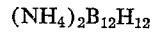

B, 40.4; C, 22.1; H, 11.6. Found: B, 40.0; C, 22.0, 21.4; H, 11.5.

*Example II*

A portion of the aqueous effluent containing H₂B₁₂H₁₂, which is obtained as described in Example A, Part B, is neutralized with hydrazine hydrate to a pH of 7. The neutral solution is evaporated to leave (NH₂NH₃)₂B₁₂H₁₂ as a white crystalline solid. A solution of this salt in hydrazine is prepared in the ratio of 0.7 part of the salt to 2 parts of hydrazine (95%+). The solution is clear and it is heated for 10 minutes at steam bath temperatures (95–98° C.) with no evidence of decomposition.

The stability of the anion B₁₂H₁₂⁻² under the above conditions is shown by diluting the hydrazine solution with water and adding an aqueous solution of tetrapropyl-ammonium bromide. The precipitate which forms is separated by filtration to obtain [(C₃H₇)₄N]₂B₁₂H₁₂ in substantially theoretical yield.

*Example III*

A hydrate of H₂B₁₂H₁₂ is dissolved in a small excess of hydrazine hydrate. The solution is cooled and a crystalline salt separates. The crystals are isolated and purified by crystallization from water. The compound is di-hydrazinium dodecahydrododecaborate(2⁻) containing 2 moles of hydrazine of crystallization.

*Analysis.*—Calc'd for (NH₂NH₃)₂B₁₂H₁₂·2NH₂NH₂: B, 48.2; H, 11.0; N, 40.8. Found: B, 46.5; H, 11.0; N, 38.6.

Solutions are prepared containing, respectively, 075, 0.9, 1.1 and 1.2 parts of the above salt in one part of hydrazine (95%+). These solutions contain respectively 42%, 47%, 52%, and 54% by weight of hydrazinium salt. The mixture containing 54% by weight of the salt requires slight warming to obtain a clear solution. However, clear solutions with less than 54% by weight of (NH₂NH₃)₂B₁₂H₁₂ are obtained by simple mixing of the components at prevailing atmospheric temperature (ca. 25° C.).

The solutions are stable against degradation or decomposition on prolonged heating, e.g., a solution containing about 43% by weight of salt [0.25 part of (NH₂NH₃)₂B₁₂H₁₂ in 0.33 part of NH₂NH₂] is heated at steam bath temperatures (95–100° C.) for 2.5 hours with no evidence of reaction or breakdown.

The solubility of a representative hydrazinium salt, i.e., (NH₂NH₃)₂B₁₂H₁₂, in hydrazine over a temperature range of 0° to 50° C. is shown in Table I, wherein the solubility is expressed as parts of H₂B₁₂H₁₂ in 100 parts of solution (% by weight).

TABLE I

| Temperature °C.: | Solubility (percent by weight of H₂B₁₂H₁₂) |
|---|---|
| 0 | 22.0 |
| 11 | 23.0 |
| 24.8 | ¹23.9 |
| 50 | 26.2 |

¹ Density, 250/40 : 1.0417. 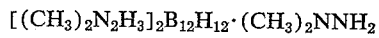

The compositions of the invention are useful as monopropellants in liquid rocket propulsion motors. They can be used also in conjunction with minor quantities of oxidizing agents, e.g., nitrogen tetroxide, fluorine oxide, and the like to provide fuels with high specific impulse and high heats of combustion.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A fluid composition comprising a hydrazine of the formula RR′NNH₂ wherein R and R′ are groups selected from the class consisting of hydrogen and lower alkyl, and a hydrazinium polyhydrododecaborate of the formula (RR′NNH₃)₂B₁₂H₁₂₋ₙXₙ wherein R and R′ are defined as above, X is a radical selected from the class consisting of OH and NH₂, and n is a cardinal number of from 0 through 4.

2. A fluid composition of claim 1 wherein the hydrazinium polyhydrododecaborate is (NH₂NH₃)₂B₁₂H₁₂₋ₙXₙ.

3. A fluid composition of claim 1 wherein the hydrazine is NH₂NH₂.

4. A fluid composition of claim 1 wherein the hydrazine is NH₂NH₂ and the hydrazinium polyhydrododecaborate is (NH₂NH₃)₂B₁₂H₁₂₋ₙXₙ.

5. A fluid composition of claim 1 wherein n is 0.

6. A process for preparing a fluid composition of claim 5 which comprises heating a compound of the formula $(R_3NH)_2B_{12}H_{12}$ wherein R is selected from the class consisting of hydrogen and lower alkyl, with a compound of the formula $RR'NNH_2$ wherein R and R' are selected from the class consisting of hydrogen and lower alkyl.

7. A fluid composition of claim 1 wherein the hydrazinium polyhydrododecaborate is $(NH_2NH_3)_2B_{12}H_{12}$.

8. A fluid composition of claim 1 wherein the hydrazine is $NH_2NH_2$ and $n$ is 0.

9. A fluid composition of claim 1 wherein R and R' are hydrogen and $n$ is 0.

10. A fluid composition of claim 1 wherein R and R' are lower alkyl and $n$ is 0.

11. Process which comprises reacting a compound of the formula $(R_3''NH)_2B_{12}H_{12}$ wherein $R''$ is selected from the class consisting of hydrogen and lower alkyl, with a compound of the formula $RR'NNH_2$ wherein R and R' are selected from the class consisting of hydrogen and lower alkyl and isolating the resulting $$(RR'NNH_3)_2B_{12}H_{12}$$

wherein R and R' are defined as above.

References Cited by the Examiner
UNITED STATES PATENTS

| | | | |
|---|---|---|---|
| 2,738,369 | 3/1956 | Banus et al. | 260—567.6 |
| 2,756,269 | 7/1956 | Bragdon | 260—567.6 |
| 3,000,712 | 9/1961 | Kilner | 149—36 |
| 3,006,743 | 10/1961 | Fox et al. | 149—22 |
| 3,070,472 | 12/1962 | Drummond | 149—22 |
| 3,169,045 | 2/1965 | Miller et al. | 23—14 |

CARL D. QUARFORTH, *Primary Examiner.*

REUBEN EPSTEIN, *Examiner.*